United States Patent [19]
Stadig

[11] 3,925,498
[45] Dec. 9, 1975

[54] OXIDATIVE DEHYDROGENATION PROCESS

[75] Inventor: William P. Stadig, Houston, Tex.

[73] Assignee: Petro-Tex Chemical Corporation, Houston, Tex.

[22] Filed: May 27, 1970

[21] Appl. No.: 40,772

[52] U.S. Cl....... 260/680 E; 260/290 V; 260/465.9; 260/654 D; 260/666 A; 260/669 R; 260/683.3; 260/696
[51] Int. Cl.$^2$............................................. C07C 5/48
[58] Field of Search ..................... 260/680 E, 669 R

[56] References Cited
UNITED STATES PATENTS

| | | | |
|---|---|---|---|
| 3,322,847 | 5/1967 | Callahan et al. | 260/680 |
| 3,450,788 | 6/1969 | Kehl et al. | 260/680 |
| 3,498,756 | 3/1970 | Carson | 260/669 X |
| 3,502,737 | 3/1970 | Ghublikian | 260/669 |
| 3,502,739 | 3/1970 | Begley et al. | 260/680 |
| 3,522,323 | 7/1970 | Duke et al. | 260/680 X |

*Primary Examiner*—Paul M. Coughlan, Jr.
*Attorney, Agent, or Firm*—N. Elton Dry; Kenneth H. Johnson

[57] ABSTRACT

An oxidative dehydrogenation having the catalyst in zones so that a portion of the oxygen can be injected between zones and mixed with the feed stream can give greatly enhanced yields from a reaction. For example, if a Mg ferrite is used in a single bed a maximum of about .65 mol of $O_2$ per mol of n-butene can be used to give a yield of 61.9% butadiene. The same catalyst in the same volume can give a yield, 77.5% of butadiene with oxygen injection to voids between zones of the catalyst at a ratio of .90 mol of $O_2$ per mol of n-butene. Normally such a high $O_2$/n-butene ratio will result in a severe decrease in selectivity of the reaction and a substantial loss in yield.

25 Claims, 2 Drawing Figures

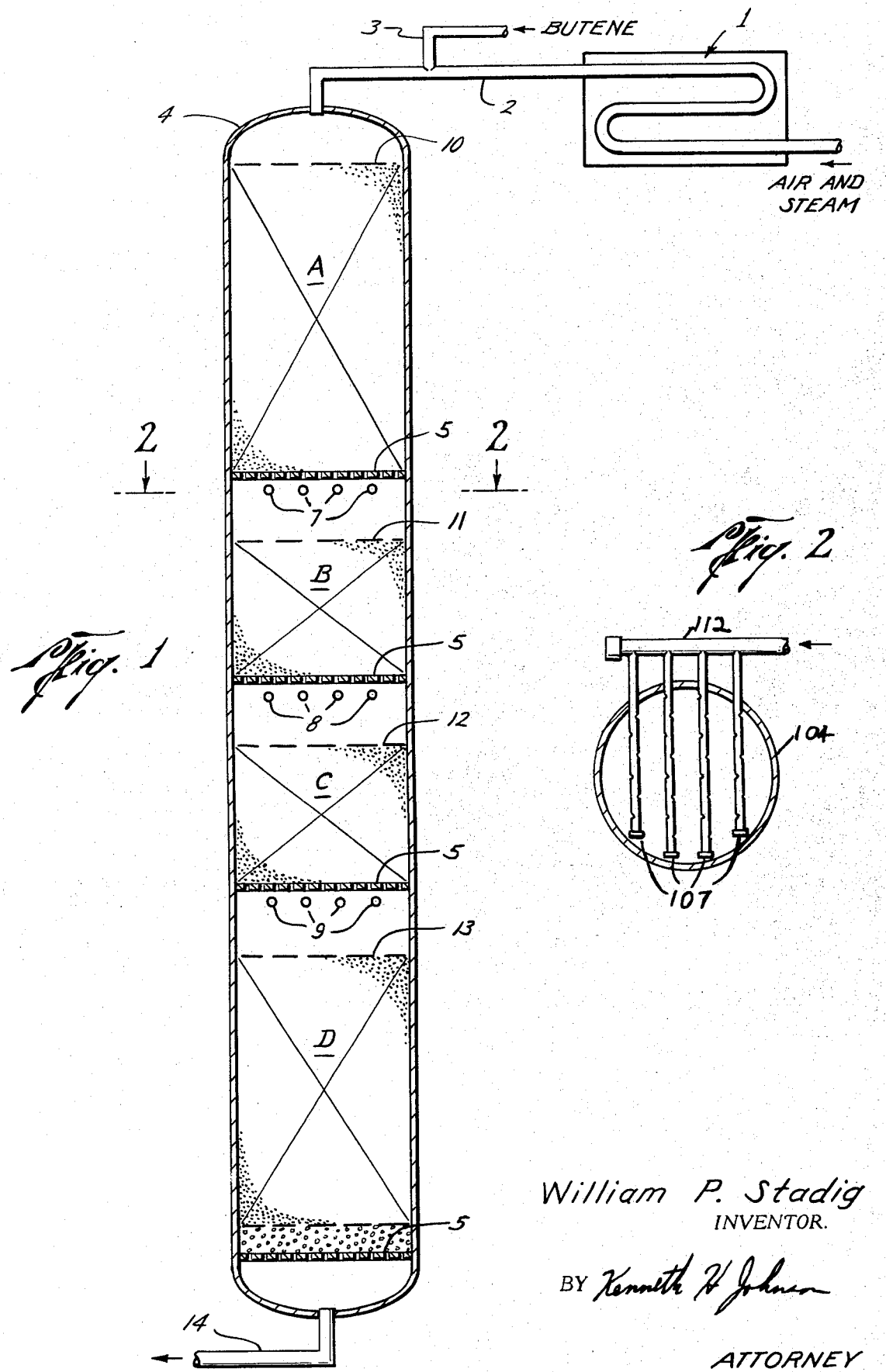

OXIDATIVE DEHYDROGENATION PROCESS

BACKGROUND OF THE INVENTION

The present invention relates to the oxidative dehydrogenation of organic compounds in vapor phase in the presence of a metal containing oxidative dehydrogenation catalyst in a fixed bed in the presence of oxygen wherein oxygen is added at various points in the reaction system. More particularly the invention relates to multiple oxygen injection to oxidative dehydrogenation zones containing a metal ferrite catalyst. A particular aspect relates to having the catalyst bed divided into at least two zones and a reactor having four catalyst zones is of special interest.

Catalysts

The types of oxidative dehydrogenation catalysts known are quite varied. The present invention is concerned with those dehydrogenation catalysts which comprise a metal compound or mixture of metal compounds. Such compounds inclued the metal oxides, metal salts such as the halides, phosphates, sulfates, molybdates, tungstates, and the like. Generally, these catalysts can be characterized as compounds containing a metal having a polyoxidation state, i.e., a metal having at least two oxidation states, in addition to the zero state. Suitable metals are found in Groups IVB, VB, VIB, VIIB, VIII, IB, IVA, VA, and VIA of the Periodic Table* of elements. Particularly useful polyoxidation state metals are Ti, V, Cr, Mn, Fe, Co, Ni, Cu, Nb, Mo, Ru, Rh, Pd, Sn, Sb, W, Re, Os, Ir, Pt, Au, Hg, Tl, Pb, Bi, and Po. Some excellent oxidative dehydrogenation catalysts include stannic phosphate, lead molybdate, aluminum tungstate, cobalt tungstate, iron oxide, antimony oxide, bismuth molybdata, chromium oxide, tungsten oxide, vanadium oxide and the like. Suitable oxidative dehydrogenation catalysts can contain one such polyoxidation state metal or a mixture of such metal compounds. Very often these catalysts will be employed in various combinations with each other as for example lead molybdate/aluminum tungstate, lead molydate/cobalt tungstate, iron oxide/chromium oxide, iron oxide/vanadium oxide, iron oxide/manganese oxide, etc.

*Handbood of Chemistry and Physics, 45th Ed., 1964–1965. The Chemical Rubber Co., Cleveland, Ohio, p. B–2

In addition to the polyoxidative state metal the oxidative dehydrogenation catalysts of the present invention can also contain one or more monooxidation state metals which act as promoters, initiators, stabilizers and the like. The single oxidation state metal or metal compounds include metals from Group IA, IIA, IIIB, IVB, VB, VIIB, IB, IIB, IIIA and IVA, preferably the divalent metals in these Groups. Specifically among those that are often found in oxidative dehydrogenation catalytic systems are Mg, Al, Ca, Sc, Zn, Sr, Cd and Ba. Aluminum oxide in the form of natural or synthetic molecular sieves has been found to be an effective oxidative dehydrogenation catalyst as shown in U.S. Pat. Nos. 3,173,855 and 3,247,278. Also found in the oxidative dehydrogenation catalysts are compounds of Be, the lanthanides, La, Hf, Ta, Ce, Pr, Nd, Pm, Sm, Eu, Gd, Tb, Dy, Ho, Er, Tm, Yb, Lu, Di (used to described a mixture of rare earths, e.g. a $Di_2O_3$ is typically 45 to 46 percent $La_2O_3$, 1 to 2 percent $CeO_2$, 9 to 10 percent $Pr_6O_{11}$, 32 to 33 percent $Nd_2O_3$, 5 to 6 percent $Sm_2O_3$, 3 to 4 percent $Gd_2O_3$, 0.4 percent $Yb_2O_3$ and 1 to 2 percent other rare earths), the actinides, (e.g. Th, Pa,) Ge, Ga, Y, Zn, Se, Te and In.

In addition to the metals the catalysts often contain various non-metallic components which also serve as promoters, initiators, stabilizers or the like. Alkali metal compounds are frequency present in the oxidative dehydrogenation catalyst in limited quantities such as $Li_2O$, $Na_2O$ and $K_2O$. Other additives are sulfur, phosphorus, silicon, boron or mixtures thereof, for example, sulfates, sulfites, sulfides, alkylmercaptans, sulfuric acid, phosphates, phosphoric acid, silica, silicates, boron trifluoride and the like. Such additives are disclosed in U.S. Pat. Nos. 3,247,278; 3,270,080; 3,303,238; 3,324,195; and 3,398,100.

Halogen is also often present in oxidative dehydrogenations to improve the results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources are such as hydrogen iodide, hydrogen bromide and hydrogen chlorde; ethyl iodide, methyl bromide, methyl chloride, 1,2-dibromoethane, ammonium iodide, ammonium bromide, ammonium chloride, sulfuryl chloride, etc. The halogen may be liberated partially or entirely by a solid source as shown in U.S. Pat. No. 3,130,241. Mixture of halogens and halogen sources can be used. The amount of halogen, calculated as elemental halogen, may be as little as about 0.0001 or less mol of halogen per mol of organic compound to be dehydrogenated to as high as 0.2 or 0.5. The use of halogens in oxidative dehydrogenations is shown in U.S. Pat. Nos. 3,210,436; 3,207,805; 3,207,810; 3,277,207; 3,278,626; 3,308,182; 3,308,200; 3,316,320; 3,356,750; 3,359,343; 3,374,283; 3,382,290; 3,440,298; and 3,442,968.

In addition to the catalysts described above, the following U.S. Pat. further described oxidative dehydrogenation catalysts generally contemplated by the instant invention: U.S. Pat. Nos. 3,260,767; 3,274,285; 3,284,536; 3,303,234-7; 3,320,329; 3,334,152, 3,336,408; 3,342,890; 3,404,193; 3,437,703; 3,446,869; and 3,456,030.

Among the preferred catalysts of this invention are those which contain iron, oxygen and at least one other metallic element Me. The catalysts comprise crystalline compositions of iron, oxygen, and at least one other metallic element Me. Ordinarily, the ionic radius of the second metallic ingredient(s) Me is small enough that the oxygen anions are not spread too far apart. That is, the elements must be able to form a crystalline structure with the iron and oxygen.

A preferred catalyst of this type is that having a face-centered cubic form of crystalline structure. Examples of this type of catalyst are ferrites of the general formula $MeO.Fe_2O_3$ where Me is a divalent metal cation such as $Mg^{++}$ or $Ni^{++}$. However, if the cations are large, such as $Sr^{++}$ (1.35A), the spinel structure may not occur and other types of ferrites having a hexagonal crystal of the type $SrO.6Fe_2O_3$ may be formed. These hexagonal ferrites are within the scope of the definition of catalysts of this invention.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient.

The catalyst may have the iron combined in crystalline structure with oxygen and more than one other metallic element, as mentioned above. For example, a preferred type of ferrite is that essentially or approximately of the formula, $MeFe_2O_4$, where Me represents a divalent metal ion with an ionic radius approximately between 0.5 and 1.1A, preferably between about 0.6 and 1.0A. In the case of simple ferrites, Me may be, e.g. one of the divalent ions of the transition elements as Mg, Ca, Sr, Ba, Cr, Mn, Co, Ni, Zn, or Cd; however, a combination of these ions is also possible to form a ferrite such as $Ni_{0.5}Mg_{0.5}Fe_2O_4$ or $Ni_{0.25}Mg_{0.75}Fe_2O_4$. Moreover, the symbol Me may represent a combination of ions which have an average valency of two.

Examples of catalysts are such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Zr, Ag, Sn, Pb, Sb, Bi, Ga, Ce, La, Th, other rare earth elements and mixtures thereof, with a preferred group being Mg, Ca, Sr, Ba, Mn, Cr, Co, Ni, Zn, Cd, and mixtures thereof, and particularly preferred metals being Mg or Mn, such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, and rare earth ferrites such as cerium ferrite or mixtures of ferrites. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite, and magnesium ferrite, plus manganese ferrite. As explained above, these ferrites may be physical mixtures of the ferrites or may contain crystals wherein the different metallic atoms are contained in the same crystal, or a combination of physical mixtures and chemical combinations. Some examples of a chemical combination would be magnesium zinc ferrite, magnesium chromium ferrite, zinc chromium ferrite and lanthanum chromium ferrite. In addition to including physical mixtures of ferrites the present invention contemplates the use of different ferrites or mixture of ferrites in the various catalysts zones. Although qualitatively the metal ferrites are equivalent, it is recognized that quantitatively they differ, not only as to the efficiency of their operation in oxidative dehydrogenation but also as to such properties as the temperature differential through the catalyst bed.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferro-magnetism, by Richard M. Bozorth (D. Van Nostrand Co., Inc., 1951), which disclosure is hereby incorporated by reference.

Although the catalysts may be broadly defined as containing crystalline structures of iron, oxygenn and the second metallic ingredient(s) of iron, oxygen and the second metallic ingredient(s), certain types of catalysts are preferred. Valuable catalysts were produced comprising as the main active constituent in the catalyst surface exposed to the reaction gases, iron, oxygen and at least one element selected from the group of Mn, or Periodic Table Groups IIA, IIB or VIII such as those selected from the group consisting of magnesium, manganese, calcium, cadmium, cobalt, zinc, nickel, barium, strontium, and mixtures thereof. Preferred catalysts have iron present as the predominant metal in the catalyst exposed to the reaction gases.

A preferred class of catalysts containing two second metallic ingredients are those of the basic formula $Me_aCr_bFe_cO_4$ where $a$ can vary within the range of about 0.1 to about 3, $b$ can vary from greater than 0 to less than 2 and $c$ can vary from greater than 0 to less than 3. Me can be any of the metallic ingredients, other than chromium, previously described, particularly Periodic Table Groups IIA, IIB, III and VIII. In particularly, the metals from these groups that are desirable are Mg, Ba, La, Ni, Zn, and Cd.

The preferred compositions exhibit a certain type of X-ray diffraction pattern. The preferred compositions do not have any sharp X-ray diffraction reflection peaks as would be found, e.g., in a highly crystalline material having the same chemical composition. Instead, the preferred compositions of this invention exhibit reflection peaks which are relatively broad. The degree of sharpness of the reflection peak may be measured by the reflection peak band width at half height (W $h/2$). In other words, the width of the reflection peak as measured at one-half of the distance to the top of the peak is the "band width at half height". The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16°2 theta and normally will be at least 0.20°2 theta.*
For instance, excellent compositions have been made with band widths at half height of at least 0.22° or 0.23°2 theta. The particular reflection peak used to measure the band width at one-half height is the reflection peak having Miller (hkl) indices of 220. (See e.g. Chapter of Klug and Alexander, ibid). Applicants do not wish to be limited to any theory of the invention in regard to the relationship between compositions, activity and band width.

*The powder diffraction patterns may be made, e.g., with a Norelco constant potential diffraction unit type No. 12215/0 equipped with a wide range goniometer type No. 42273/0 cobalt tube type No. 32110, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1160 volts and the pulse height analyzer is set to accept pulses with amplitudes between 10 and 30 volts only. Slits used are divergence 1°, receiving .006 inches and scatter 1°. Strip chart recordings for identification are made with a scanning speed of ¼° per minute, time constant of 4 seconds and a full scale of $10^3$ counts per second. No correction is made for K $\alpha$ doublet or instrumental broadening of the band widths.

Suitable preferred ferrites according to this invention are zinc ferrites having X-ray diffraction peaks within the $d$-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52 with the most intensive peak being between 2.51 to 2.57; manganese ferrite having peaks at $d$-spacings within or about 4.87 to 4.93, 2.97 to 3.03, 2.50 to 2.58, 2.09 to 2.15, 1.70 to 1.76, 1.61 to 1.67 and 1.47 to 1.53, (with other peaks) with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the d-spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominately present as a valence of plus 2.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Salts of the desired metals may be coprecipitated and the precipitate heated to form the ferrite. Desired ferrites may be obtained by conducting the reaction to form the ferrite at relatively low temperatures, that is, at temperatures lower than some of the very high temperatures used for the formation of some of the semiconductor applications. Good results, e.g., have been obtained by heating the ingredients to a temperature high enough to produce the required ferrite but at conditions no more severe than equivalent to heating at 950°C. or 1000°C. for 90 minutes in air and generally the temperature will be less than 1300°C. and preferably less than 1150°C. Methods for preparing catalysts suitable for this invention are disclosed in U.S. Pat. Nos. 3,270,080; 3,284,536; 3,303,234-6; 3,303,238; 3,308,182; 3,334,152; 3,342,890 and 3,450,787 and these disclosures are hereby incorporated by reference.

The ferrite catalysts may contain an excess of iron over the stoichiometric amount to form the ferrite. For example, in a ferrite of the type $MeFe_2O_4$ the stoichiometric amount of iron would be 2 atoms per atom of Me. The iron (calculated as $Fe_2O_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of Me over the stoichiometric amount. A suitable range of Me content would be from about 0.05 to 2 atoms of Me per atom of iron.

Excellent ferrite catalysts may contain less than 5 weight percent, and preferably less than 2 weight percent of sodium or potassium in the surface of the catalyst. Solid sulfur containing compounds such as manganese sulfate can be incorporated along with manganese carbonate to form a sulfur containing manganese ferrite. Another method is to mix a ferrite, e.g. nickel ferrite with a solution of sulfuric acid. The resulting slurry can then be dried and pelleted or coated on a carrier and then dried. Similarly phosphorous can be incorporated in the metal ferrite as shown in U.S. Pat. No. 3,398,100.

Various methods have been employed to prepare dehydrogenation catalyst. Although the catalyst may be comprised of a single compound such as iron oxide, it has more often been the case that cocatalysts possess advantages over the single components such as a magnesium — iron oxide. Also, as pointed out above, various metal and non-metal promoters, initiators, stabilizers and the like are often desirable. These catalysts have been prepared by precipitation, by dry or wet milling or mixing, by precipitation of one of the ingredients in the presence of the other, coprecipitation and impregnation of one or more of the solid ingredients with aqueous or non-aqueous solution(s) of salt(s) of the additional ingredient(s).

For example, one method previously used for preparing a lead molybdate/cobalt tunstate is by mixing a soluble salt of lead and a soluble molybdate salt. The lead molybdate is washed free of electrolyte and slurried with an aqueous solution of a soluble cobalt salt which is precipitated as the tungstate by mixing with a soluble tungstate salt. The resulting precipitate is washed free of electrolyte, dried and calcined. Metal ferrite oxidative dehydrogenation catalysts, for example magnesium ferrite, have been prepared by contacting magnesium oxide pellets with a solution of ferric nitrate, drying and calcining. Ferric oxide catalyst per se is often prepared by precipitation, i.e. a solution of a soluble salt of iron, $FeCl_3$ is precipitated by the addition of a base, NaOH to form $Fe(OH)_3$ a gelatinous, precipitate, which is then dehydrated.

Carriers or supports for the catalyst may be employed such as alumina, pumice, silica and so forth. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

The catalysts may be activated or regenerated by reducing with a reducing gas, e.g., such as hydrogen or hydrocarbons. For example, the preformed compositions may be reduced with, e.g., hydrogen at a temperature of at least 250°C. with the temperature of reduction generally being no greater than 850°C. The period of time for reduction will be dependent somewhat on the temperature of reduction and the concentration of the reducing gas.

PROCESS

The addition of oxygen in increments, such as to different sections of the reactor has been suggested as an alternative to adding the total amount of oxygen to the gaseous feed at the beginning of the reaction, for example, in U.S. Pat. Nos. 3,270,080; 3,248,536; 3,303,234-8; 3,308,182; 3,324,195; 3,334,152; 3,342,890 and 3,398,100. The admonition to add a portion of the total oxygen requirement at various points in the reactor, theoretically at least, should allow better distribution of the reaction throughout the catalyst bed and give better yields. In practice, however, this modification offered slight improvements as compared to the injection of the oxygen at one point in the reactor along with the other reactants, until the present invention.

SUMMARY OF THE INVENTION

Briefly stated, the present invention is in a process for the oxidative dehydrogenation of organic compounds with a metal containing oxidative dehydrogenation catalyst in a fixed bed in the presence of oxygen by passing a mixture comprising said organic compound and oxygen through said fixed bed wherein the improvement comprises adding incremental amounts of oxygen to said organic compounds as said organic compounds pass through said fixed bed and intimately mixing said oxygen and said organic compounds said adding and mixing occurring in the absence of said catalyst. i.e., said catalyst is non-contiguous with said adding and mixing. One object of the present invention is to improve the yield of dehydrogenation product possible with a specified catalyst in oxidative dehydrogenations. Another object is to obtain better control over the oxidative dehydrogenation reaction. It is a further object to reduce the temperature of operating the reaction. Still another object is to reduce the utilities required to operate the reaction. Another object is to improve the catalyst life. These and other objects and advantages of the present invention will become apparent from the following discussion.

DRAWINGS

In the drawings,

FIG. 1 is a schematic representation of the operation of an oxidative dehydrogenation using a reactor with multiple catalyst beds which are separated by open spaces or voids.

FIG. 2 is a cross section of the reactor 4 of FIG. 1 at 2—2.

DESCRIPTION OF THE INVENTION

It has now been found that the injection of a portion of the oxygen employed in the oxidative dehydrogenation into the reactor along the catalyst bed can provide a substantial improvement over injection of all of the oxygen into the initial feed to the reactor.

The oxygen injection should not be made directly into the catalyst, instead the immediate area surrounding the injection should be catalyst free. So long as the oxygen is injected into or allowed to contact and mix with reaction gases passing through the reactor in the absence of catalyst there can be an improvement in the results of the reaction. For example U.S. Pat. No. 3,458,289 shows hollow perforated bars with sparge tubes located in the bars. The bars can be placed in the catalyst bed and will not permit the catalyst to come in contact with the sparged gases but allow the reaction gases to pass through and mix with sparged gases. Other conventional and known apparatus should be suitable to achieve the purposes of the present invention also.

In a preferred embodiment, it has been found now that by providing at least two catalyst zones and injecting the oxygen into the reactant stream prior to each zone, a substantial improvement can be achieved over the single injection or a multi-injection into the catalyst bed. A convenient manner of achieving the catalyst zones is to use a single reactor with a space being provided between the catalyst zones. The space can be provided by placing substantially inert materials such as alumina, silica, alumina, quartz, firebrick, or other refractory materials between layers of catalyst so that the reactor bed is comprised of alternating layers of catalyst and inert material. The inert material will usually be of the same general partical size as the catalyst, although substantially larger or smaller materials can be used. For example, 1/16 inch to 2 inches diameter in single or mixed sizes.

In another embodiment the space between catalyst layers is a substantial void. An absolute void would be difficult or impractical to achieve. The term "substantially void" is used here to described an open space which may be entirely free of any obstruction or a space containing fixed or movable baffles, piping or the like, but free of particulate material or more specifically free of catalytic or inert particulate material. The reactor and the arrangement of the catalyst zones and spaces do not require a single unitary reactor. The various zones and spaces can actually be contained in connected but separate reactors. The space in fact can be a conduit connecting two catalyst beds with the oxygen being added to the conduit.

The oxygen (and usually a diluent such as steam) can be added to the space between the beds by any convenient means such as a series of transversely mounted multi-perforated tubes, a well "distribution" spider or an arrangement as shown in U.S. Pat. No. 3,433,600. The reaction gases can also be withdrawn and the additional oxygen mixed with the reactants externally, then fed back into the reactor, i.e., the next catalyst reactants externally, then fed back into the reactor, i.e., the next catalyst bed.

The catalyst beds may be arranged either vertically or horizontally. Usually a support or separating means will be used between various layers or zones. When an inert packing material is employed between catalyst beds it may not be necessary to have such separating means, although such means are generally desirable to facilitate removal or replacement of the different zone. Suitable supports can be grids, screens, perforated trays or the like. The opening in such partitions are determined by the size of the particulate material present and generally should be as large as practical without allowing the particulate material to pass through.

The space between catalyst zones is not critical in relation to said zones. Generally the space will be as small as practical to provide the advantages and improvement as set out herein, however, a large space relative to the catalyst zones is not necessarily detrimental although impractical. Furthermore, the size of the space between various zones can vary in regard to each other. Likewise, the size of the catalyst zones can vary one from the other. However, the catalyst zones preferably should be of sufficient depth in the case of a vertical reactor, so that reaction will not pass out of the catalyst bed.

The total amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally the total amount of oxygen will be supplied (including all sources, e.g. air to the reactor) in the dehydrogenation zone in an amount from about 0.2 to 1.5 preferably 0.3 to 1.2 mols per mol of $H_2$ being liberated from the organic compounds. Ordinarily the mols of oxygen supplied will be in the range of from 0.2 to 2.0 mols per mol of organic compound to be dehydrogenated and for most dehydrogenations this will be within the range of 0.25 to 1.5 mols of oxygen per mol of organic compound.

The amount of oxygen initially entering the reactor with the feed to the dehydrogenation zone will be about 5 to 90% of the total oxygen feed to the reaction. The balance of the oxygen will be admixed with the reaction gases further along in the reaction zone by one of the means previously described.

The catalyst immediately following an oxygen addition point along the path of the flow of the reactants to the next point of oxygen addition or end of the catalyst bed can be considered a "catalyst zone". Using this basis then the quantity fed to the first catalyst zone will be about 0.1 to 1.0 mol of oxygen per mol of total organic compound to be dehydrogenated and more preferably about 0.3 to 0.6 mol. The balance of the xoygen is fed to the space between the catalyst zones. Usually the largest proportion of the remaining oxygen to be fed, is fed prior to the second catalyst zone which will be about 0.05 to 0.6 mol and preferably 0.1 to 0.3 mol of oxygen per mol of total organic compound to be dehydrogenated.

When more than two catalyst zones are employed, i.e., in addition to oxygen being fed to the dehydrogenation feed and one point along the path of the reactant flow there are other points of oxygen addition, the oxygen fed to the third and subsequent zones is about 0.05 to 0.3 mol and preferably no more than 0.2 mol of oxygen per mol of total organic compound to be dehydrogenated. Unless stated otherwise the oxygen ratio used in the examples and claims are based on total organic compounds to be dehydrogenated.

Stated somewhat differently the operation of each catalyst zone will employ about 0.1 to 1.0 mol of oxygen per mol of organic compound to be dehydrogenated in said catalyst zone, preferably about 0.3 to 0.6 mol. Thus in each subsequent catalyst zone after the first zone the ratio of oxygen to organic compound to be dehydrogenated remains in the same ranges as in the first zone, but since some of the available organic compound has undergone dehydrogenation in a previous zone there is less available organic compound to be dehydrogenated, hence the need for less oxygen in the second and subsequent zones as compared to the first zone.

It is believed that the improved results and advantages obtained with the present process are at least in part, the result of the control and distribution of the oxygen throughout the reaction system thus allowing better contact of the organic reactants and the oxygen over the available catalyst surface. The distribution of the reactants throughout the system improves the temperature control and the temperature profile in the catalyst bed, reducing hot spots and temperature differential.

It is a characteristic of catalytic oxidative dehydrogenations that the activity of the catalyst tends to decline over a period of time as the catalyst is used. This relationship of declining catalytic activity to time in use is often referred to as the "time trend" of the catalyst. The decline in catalytic activity will continue as the catalyst is used to a point where it can no longer be economically employed in the process. Since the catalyst is a key cost factor in oxidative dehydrogenations as well as the trouble and expense in removing and disposing of the spent catalyst, an improved time trend, i.e., slower loss of activity can afford a substantial increase in productivity. In this regard a substantial improvement in catalyst time trend has been observed with the present invention.

Preferably, the reaction mixture contains a quantity of steam or diluent such as nitrogen with the range generally being between about 2 and 40 mols of stream per mol of organic compound to be dehydrogenated. Preferably, steam will be present in an amount from about 3 to 35 mols per mol of organic compound to be dehydrogenated and excellent results have been obtained within the range of about 5 to about 30 mols per steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound. Where a diluent such as steam is present a substantial portion, i.e. 20 to 90% and preferably about 40 to 80% will be to the first catalyst zone, for example, 2 to 35 mols of steam per mol of organic compound fed. More usually about 5 to 25 mols of steam per mol of organic compound will be added.

It has been found advantageous to add all or a substantial quantity, i.e. 10 to 60% of the remaining steam to be added to the reaction vapors, between the first and second catalyst zones. As stated above, the steam diluent has several functions. One of these functions is related to temperature control. Since the oxidative dehydrogenation is exothermic, the steam can serve as a damper on the reaction. However, since the steam can curtial the reaction, it is usually added to the first reaction zone at a high temperature to avoid killing the reaction, e.g., 350° to 400°C. By adding a portion of the steam along with a portion of the oxygen into the subsequent catalyst zones it can be added at a somewhat lower temperature, for example 110° to 250°C. The function of temperature control is particularly enhanced by the addition between the first and second catalyst zones.

Small quantities of steam, i.e., 0.1 to 10 mols, preferably 0.5 to 8 mols per mol of organic compound to be dehydrogenated, can be fed to the reaction vapors between the second and third and subsequent catalyst zones.

The temperature for the dehydrogenation reaction generally will be at least about 250°C, such as greater than about 300°C. or 375°C., and the maximum temperature in the reactor may be about 700° C. or 800°C. or perhaps higher such as 900°C. under certain circumstances. However, excellent results are obtained within the range of or about 350°C. to 700°C., such as from about 400°C. to about 675°C. The temperatures are measured at the maximum temperature in the dehydrogenation zone.

The gaseous reactants may be conducted through the reaction chamber at a fairly wide range of flow rates. The optimum flow rate will be dependent upon such variables as the temperature of reaction, pressure, particle size, and so forth. Desirable flow rates may be established by one skilled in the art. Generally, the flow rates will be within the range of about 0.10 to 10 liquid volumes of the organic compound to be dehydrogenated per total volume of dehydrogenation zone containing catalyst per hour (referred to as LHSV). Usually, the LHSV will be between 0.15 and about 5. For calculations, the volume of a fixed bed dehydrogenation zone containing catalyst is that original void volume of reactor space containing catalyst.

It is one of the advantages of this invention that halogen may also be present in the reaction gases to give excellent results. The presence of halogen in the reaction gases is particularly effective when the compound to be dehydrogenated is saturated, such as a saturated hydrocarbon. The halogen present in the reaction gases may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, cycloaliphatic halides, ammonium iodide, ammonium bromide;

ammonium chloride sulfuryl chloride; metal halides including molten halides; and the like. The halogen may be liberated partially or entirely by a solid source as disclosed in the process of U.S. Pat. No. 3,130,241, issued Apr. 21, 1964. Mixtures of various sources of halogen may be used. The amount of halogen, calculated as elemental halogen, may be as little as about 0.0001 or less mol of halogen per mol of the organic compound to be dehydrogenated to as high as 0.2 or 0.5.

The process of this invention utilizes a fixed bed reactor. Reactors which have been used for the dehydrogenation of hydrocarbons by nonoxidative dehydrogenations are satisfactory such as the reactors for the dehydrogenation of n-butene to butadiene-1,3. The reactors can be equipped with various conventional internal and external heat exchangers such as heat transfer tubes placed between or within the catalyst beds. Although means for indirect removal of heat from the reactor may be employed, the invention is particularly useful with essentially adiabatic reactors where temperature control is a problem.

The process of this invention may be applied to the dehydrogenation of a wide variety of organic compounds. Such compounds normally will contain from 2 to 20 carbon atoms, at least one

grouping a boiling point below about 350°C, and such compounds may contain other elements, in addition to carbon and hydrogen such as oxygen, halogens, nitrogen and sulfur. Preferred are compounds having 2 to 12 carbon atoms and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride, methyl isobutyrate to methyl methacrylate; 2 or 3 chlorobutene-1 or 2, 3 dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1,3; n-butene to butadiene-1,3, and vinyl acetylene; methyl butene to isoprene; cyclopentane to cyclopentene and cyclopentadiene-1,3; n-octane to ethyl benzene and ortho-xylene; monomethylheptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl napthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate and the like.

Suitable dehydrogenation reactions are the following; acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quaternary carbon atom to aromatic compounds, such as 2,4,4-trimethylpentene-1 to a mixture of xylenes; acyclic compounds having 6 to 16 carbon atoms and no quaternary carbon atoms to aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quaternary hydrocarbons having 4 to 5 contiguous carbon atoms or ethyl benzene and the preferred products are n-butene-1 or 2, butadiene-1, 3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents and so forth. Although determinations regarding the mechanism of reaction are difficult, the process of this invention is an oxidative dehydrogenation process wherein the predominant mechanism of this invention is by the reaction of oxygen with the hydrogen released from the hydrocarbon.

The operation of the invention can be further explained by reference to the drawings. In FIG. 1 a suitable dehydrogenation feed, for example, butene-2, is passed to the reactor 4 by adding the butene-2 via line 3 to a mixture of air and steam coming from heater 1 via line 2. The air and steam mixture flowing through line 2 is a portion of the total air and steam to be employed in the dehydrogenation. The desired product in this case is butadiene. The air and steam mixture coming from heater 1 is super heated to about 483°–496°C. The butene-2 feed is at about 166°–171°C. As the gases pass into the reactor 4 they are at about 357°C. The gases will flow downward through catalyst bed A which is supported by a perforated plate or tray 5. The depth of bed A is indicated by line 10. In a similar manner the other catalyst beds are supported by a perforated plate 5. The reaction gases pass through the plate 5 and an additional portion of the total quantity of oxygen and steam is added through sparge tubes 7 having holes along the sides thereof and which are transversely mounted in the reactor 4. There is a substantially open space between catalyst zone A and zone B which begins at 11. The reaction gases pass through catalyst zone B past sparge tubes 8 where a further portion of the total oxygen and steam for the reaction is added, hence into zone C, delineated by line 12, and past sparge tubes 9 where the final portion of air and steam are injected into the reaction gases which then pass through catalyst zone D delineated by line 13 and out of the reactor through line 14 to waste heat boiler, condensers, and the like (not shown). The air and steam injected through sparges 7, 8 and 9 were at a far lower temperature than the entering the top of the reactor through line 2, i.e., about 121°C. This results in a considerable utility saving since no more total steam is required in the present process than when the total amount is added to the top of the reactor, yet superior results are obtained. It may be possible to operate with equivalent or superior results in the present process with less total steam and realize a further economy in operation.

FIG. 2 is a cross section of reactor 4 at 2—2 showing the arrangement of the sparges 107 across the reactor 104. Oxygen (and optionally steam) are fed to sparge tubes 107 from line 112. Specific runs in a process and apparatus similar to that described in drawings are set out in the examples which will illustrate particular embodiments and the concept of the invention. The conversions, selectivities and yields are in mole percents, otherwise all percentages are weight percents unless expressed to the contrary. Analysis of results was by gas liquid chromatography of the reactor feed and effluent.

EXAMPLE 1–7

The reactor employed in these runs was a Schedule 40, 8-inch stainless steel pipe about 49 inches long. The reactor had four beds arranged vertically. The space between beds was about 3 inches. Each catalyst bed was supported in the reactor by a stainless steel plate having ⅛ inch holes over its surface. Below the first three plates there are 4 transversely placed sparge tubes which are perforated along both sides at about one-inch intervals. The sparge tubes are located in a space between each catalyst bed and the preceding bed. The uppermost bed was 10-inches deep, the next two beds were 5-inches deep and the fourth bed was 12 inches deep. The fourth bed did not rest directly on a perforated plate but was disposed on top of a 3-inch bed of 6 mesh AMC alumina, which as to prevent catalyst particles from falling through the support plate into the bottom of the reactor. Superheated air and steam at about 483°–496°C were fed to the top of the reactor. The dehydrogenation feed (90 % n-butene-2 and n-butene-1, the remainder being principally n-butane, isobutane and butadiene) was added to this stream at about 166°–171°C so that the temperature of the vapors at the top of the bed was about 357°C.

The metering systems for steam and air were set up so that any portion of steam and air (prior to being fed to a heater) could be sent to any of the sets of sparge tubes. The metering systems automatically deducted the portions of air or steam sent to the sparge tubes from the flow of air and steam to the top of the reactor. The air and steam to the sparge tubes were drawn off prior to the heater and as a result are substantially cooler, being at about 121°C. The conditions for each run and the results are set out in Table I. All runs were made at a liquid hourly space velocity (LHSV) of 1.5.

The catalyst was a magnesium ferrite prepared by slurrying $Fe_2O_3 \cdot H_2O$ and $MgCO_3$. The slurry was extruded, dried, milled, mixed with a 3% solution of 85% phosphoric acid, discharged into a suitable pellet mill, dried and calcined.

TABLE I

| Example No. | Oxygen Mol $O_2$/mol n/butene | | | | | Steam Mol Steam/Mol HC | | | | | Results | | |
|---|---|---|---|---|---|---|---|---|---|---|---|---|---|
| | Total | Top | Distribution | | | Total | Top | Distribution | | | Conversion | Selectivity | Yield |
| | | | 1st Sparge | 2nd Sparge | 3rd Sparge | | | 1st Sparge | 2nd Sparge | 3rd Sparge | | | |
| 1 | 0.65 | 0.65 | 0 | 0 | 0 | 15 | 15 | 0 | 0 | 0 | 67.7 | 91.4 | 61.9 |
| 2 | 0.70 | 0.4 | 0.1 | 0.1 | 0.1 | 15 | 12 | 1 | 1 | 1 | 77.9 | 92.1 | 71.8 |
| 3 | 0.80 | 0.5 | 0.1 | 0.1 | 0.1 | 15 | 12 | 0.8 | 1.5 | 0.7 | 80.5 | 90.3 | 72.7 |
| 4 | 0.80 | 0.4 | 0.2 | 0.1 | 0.1 | 15 | 8 | 5 | 1 | 1 | 80.4 | 90.7 | 73.4 |
| 5 | 0.80 | 0.3 | 0.3 | 0.1 | 0.1 | 14 | 8 | 4 | 1 | 1 | 79.9 | 90.4 | 72.2 |
| 6 | 0.80 | 0.4 | 0.2 | 0.1 | 0.1 | 13 | 8 | 3 | 1 | 1 | 76.2 | 89.6 | 68.3 |
| 7 | 0.90 | 0.45 | 0.15 | 0.15 | 0.15 | 18 | 12 | 3 | 2 | 1 | 86.9 | 89.1 | 77.5 |

It should be noted that the present process is conducive to higher mol ratios of oxygen to butene. Normal experience has been than an increase in oxygen results in increased conversion but a sharp drop in selectivity. Example 2 shows that for 0.05 ratio increase in oxygen in the present process there was in fact an increase in selectivity. Even at 0.90 $O_2$/n-butene (Example 7) the drop in the selectivity was so slight that the corresponding increase in conversion gave a yield of 77.5%, an increase of 15.6%.

EXAMPLE 8

In this example a vertical reactor having four beds of 5 inches, 5 inches, 5 inches and 10 inches depth respectively was used with the space between the catalyst beds being filled with inert ½ inch diameter, aluminum oxide balls. The catalyst was magnesium ferrite prepared in the same manner as the catalyst in Examples 1–8 but with a 2% solution of 85% phosphoric acid. The feed was butene-2*, the LHSV was 2.0. The total mol ratio of oxygen to hydrocarbon was 0.7/1 (0.4 at top, 0.1 at first, second and third sparge each) total steam to hydrocarbon mol ratio of 19/1 (13 at top, 2 at first, second and third sparge each). The dehydrogenation was on stream for 846 hours to give C/S/Y of 73.0/92.9/67.8. A comparable run (steam/HC 24/1) without multiple injection gave C/S/Y of 70.3/92.3/64.9. The inlet temperature at the top of reactor in both runs was about 399°C. The sparged air and steam were at about 121°C.

*Substantially the same feed as Examples 1-7

EXAMPLES 9-10

These examples demonstrate the use of a reactor containing a single bed of catalyst with sparge tubes located transversely in the catalyst. The catalyst was magnesium ferrite similar to that used in Example 8.

The sparge tubes were located 4 inches and 12 inches from the top of the catalyst bed which was 17¾ inches deep. The dehydrogenation feed was butene-2*. During the first part of the run (Example 9) all of the oxygen and steam were added at the top of the reactor along with the butene-2. At mol ratio $O_2$/n-butene = 0.71 and steam/HC = 20, LHSV = 3.0 the C/S/Y was 7.18/88.9/63.8. When various combinations of air and steam were directed to the inlet and sparge tubes (Example 10 is representative) similar results were obtained as when all of the oxygen and steam were added at the top of the reactor, as can be seen from the comparison in the Table II below:

TABLE II

|  | Example 9 | Example 10 |
| --- | --- | --- |
| Max. Temp. °C | 604 | 546 |
| LHSV | 3.0 | 3.0 |
| $O_2$/n-butene Mole Ratio Total | 0.71 | 0.72 |
| Top | 0.71 | 0.49 |
| 1st Sparge | — | 0.12 |
| 2nd Sparge | — | 0.12 |
| S/HC mole ratio total | 19.9 | 19.6 |
| Top Sparge | 19.9 | 13.6 |
| 1st Sparge | — | 3. |
| 2nd Sparge | — | 3. |
| C/S/Y Mole % | 71.8/88.9/63.8 | 68.2/90.9/62.0 |

The injection of steam alone to the sparge tubes resulted in poorer results than in Example 9, e.g., C/S/Y = 70/88.6/61.3, total steam/HC mol ratio = 18/1, top 10.4, first sparge 3.8, second sparge 3.8, $O_2$/n-butene mol ratio = .77, LHSV 1.82, max. temp. 524°C.

EXAMPLE 11

The same reactor as in Examples 9 and 10 was employed. The pelleted catalyst of Example 8 was used and a layer of inert ½ inch aluminum oxide balls placed around each sparge, creating three catalyst zones of 6, 5 and 10 inches respectively. The inert zones were 3 inches each. The feed was butene-2*, LHSV was 2.0, inlet temperature about 357°C; total $O_2$/n-butene mol ratio was 1.03 (top. 44, first sparge .40, second sparge .19); total steam/HC mol ratio 21.3 (top 15, first sparge 2.8, second sparge 3.5). The C/S/Y mole % was 88.4/87.6/77.4.

*Substantially the same feed as Example 1-7

EXAMPLES 12-15

These examples demonstrate the improved dehydrogenation of isoamylene to isoprene. The reactor was of the same general design as previously described. There were two sets of sparges, located 8 and 11 inches (excluding inerts) from the top of the catalyst bed. The length of the first zone was 8 inches, followed by sparges situated in the middle of a 3-inch space surrounded by 3–5 mesh AMC alumina. The second catalyst zone was 3-inches deep followed by a 3-inch bed of 3–5 mesh AMC alumina with the sparges situated therein. The final catalyst zone was 15 inches deep.

The catalyst was a manganese ferrite in pellets. The catalyst was prepared substantially as in Example 1–7 using $Fe_2O_3$, and $MnCO_3$. A 2.5% solution of 85% phosphoric acid was used to dampen the material for pelleting. The conditions and results are set out in Table III.

TABLE III[1]

| Example | HCl/HC | Total $O_2$/HC | Zone 1[2] $O_2$/HC | S/HC | Zone 2[3] $O_2$/HC | S/HC | Zone 3[4] $O_2$/HC | S/HC | Total S/HC | Temp °F | C/S/Y |
| --- | --- | --- | --- | --- | --- | --- | --- | --- | --- | --- | --- |
|  | Mole Ratio | Mole Ratio | Mole Ratio |  | Mole Ratio |  | Mole Ratio |  | Mole Ratio |  |  |
| 12 | 0.007 | 0.7 | 0.7 | 26.6 | 0 | 0 | 0 | 0 | 26.6 | 585 | 44/87/38 |
| 13 | 0.005 | 0.7 | 0.5 | 10.6 | 0.1 | 4.7 | 0.1 | 3.7 | 19.0 | 566 | 47/89/42 |
| 14 | 0.005 | 0.7 | 0.5 | 10.0 | 0.1 | 4.4 | 0.1 | 3.6 | 18.0 | 538 | 49/91/44 |
| 15 | 0.005 | 0.7 | 0.5 | 9.0 | 0.1 | 5.2 | 0.1 | 3.8 | 18.0 | 538 | 46/89/41 |

[1]LHSV = 1.0
[2]Fed to the top of the reactor along with isoamylenes
[3]Fed to First Sparge
[4]Fed to Second Sparge
[5]Maximum temperature measured in reactor
S = Steam
HC = Hydrocarbon
HCl Fed with HC

The invention claimed is:

1. In a process for the oxidative dehydrogenation of organic compounds with a metal containing oxidative dehydrogenation catalyst in a fixed bed in the presence of oxygen by passing a mixture comprising said organic compound and oxygen through said fixed bed wherein the improvement comprises adding incremental amounts of oxygen to said organic compounds as said organic compounds pass through said fixed bed and intimately mixing said oxygen and said organic compounds, said adding and mixing occurring in the absence of said catalyst.

2. The process according to claim 1 wherein said fixed bed comprises at least two catalyst zones.

3. The process according to claim 2 wherein said increments of oxygen are added to said organic compounds prior to each catalyst zone.

4. The process according to claim 3 wherein the catalyst zones are separated by a zone free of catalyst.

5. The process according to claim 4 wherein said increments of oxygen are added and mixed with said organic compounds in said zone free of catalyst.

6. The process according to claim 5 wherein said zone free of catalyst is substantially void.

7. The process according to claim 5 wherein said zone free of catalyst contains an inert material.

8. the process according to claim 1 wherein said metal containing oxidative dehydrogenation catalyst is a metal ferrite.

9. The process according to claim 8 wherein said fixed bed comprises at least two catalyst zones.

10. The process according to claim 9 wherein said increments of oxygen are added to said organic compounds prior to each catalyst zone.

11. The process according to claim 10 wherein the catalyst zones are separated by a zone free of catalyst.

12. The process according to claim 11 wherein said increments of oxygen are added and mixed with said organic compounds in said zone free of catalyst.

13. The process according to claim 12 wherein the metal portion of the metal ferrite catalyst is selected from the group consisting of Mg, Zn, Ni, Co, Mn, Cu, Cd, Ca, Ba, Sr, Al, Cr, Ti, V, Mo, W, Na, Li, K, Zr, Ag, Sn, Pb, Sb, Bi, Ga, Ce, La, Th other rare earth elements and mixtures thereof.

14. The process according to claim 13 wherein the metal portion of the metal ferrite catalyst is selected from the group consisting of Mg, Ca, Sr, Ba, Mn, Cr, Co, Ni, Zn, Cd and mixtures thereof.

15. The process according to claim 14 where the metal portion of the metal ferrite catalyst is Mg or Mn.

16. The process according to claim 13 wherein a total of 0.2 to 2.0 mols of oxygen per mol of organic compound to be dehydrogenated is added in increments to said organic compounds.

17. The process according to claim 16 wherein the increment of said oxygen added to said organic compounds prior to the first catalyst zone is about 5 to 90% of the total oxygen to be added to said process.

18. The process according to claim 17 wherein about 0.1 to 1.0 mol of oxygen per mol of total organic compound to be dehydrogenated is added to said organic compounds prior to the first catalyst zone, about 0.05 to 0.6 mol of oxygen per mol of total organic compound to be dehydrogenated is added to said organic compounds prior to the second zone and about 0.05 to 0.3 mol of oxygen per mol of total organic compound to be dehydrogenated is added prior to each catalyst zone after the second catalyst zone.

19. The process according to claim 18 wherein a diluent is present.

20. The process according to claim 19 wherein the diluent is steam.

21. The process according to claim 20 wherein about 40 to 80% of the steam to be added is added prior to the first catalyst zone and about 10 to 60% of the steam to be added is added prior to the second catalyst zone.

22. The process according to claim 21 wherein the organic compounds are hydrocarbons.

23. The process according to claim 22 wherein the hydrocarbons have 4 to 5 non-quaternary contiguous carbon atoms.

24. The process according to claim 23 wherein the hydrocarbon comprises a n-butene and the catalyst comprises magnesium ferrite.

25. The process according to claim 23 wherein the hydrocarbon comprises isopentene and the catalyst comprises manganese ferrite.

* * * * *

UNITED STATES PATENT OFFICE
CERTIFICATE OF CORRECTION

PATENT NO. : 3,925,498
DATED : December 9, 1975
INVENTOR(S) : William P. Stadig

It is certified that error appears in the above-identified patent and that said Letters Patent are hereby corrected as shown below:

Col. 1, line 22 reads "inclued" but should read ---include---

Col. 1, line 36 reads "molybdata" but should read ---molybdate---

Col. 2, line 6 reads "frequency" but should read ---frequently---

Col. 2, line 24 reads "chlorde" but should read ---chloride---

Col. 3, line 64 reads "oxygenn" but should read ---oxygen---

Col. 6, line 10 reads "tunstate" but should read ---tungstate---

Col. 7, line 68 reads "described" but should read ---describe---

Col. 8, lines 17 and 18 reads "i.e., the next catalyst reactants externally, then fed back into the reactor," but should read --- i.e., the next catalyst bed ---

Col. 9, line 3 reads "xoygen" but should read ---oxygen---

Col. 10, line 18 reads "curtial" but should read ---curtail---

Col. 14, line 1 reads "which as" but should read ---which was---

UNITED STATES PATENT OFFICE
CERTIFICATE OF CORRECTION

PATENT NO. : 3,925,498
DATED : December 9, 1975
INVENTOR(S) : William P. Stadig

It is certified that error appears in the above-identified patent and that said Letters Patent are hereby corrected as shown below:

Col. 15, line 17 reads "7.18/88.9" but should read ---71.8/88.9---

Col. 16, Table III, under heading C/S/Y reads "49/91/44" but should read --- 48/91/44 ---

Col. 18, line 7 reads "compunds" but should read --- compounds ---

Signed and Sealed this twenty-fifth Day of May 1976

[SEAL]

Attest:

RUTH C. MASON
Attesting Officer

C. MARSHALL DANN
Commissioner of Patents and Trademarks